United States Patent [19]

Muller

[11] 4,188,836
[45] Feb. 19, 1980

[54] REPAIR PART AND METHOD FOR REPAIRING TRANSMISSION DETENT CABLE

[76] Inventor: Richard B. Muller, 5415 Providence Rd., Charlotte, N.C. 28211

[21] Appl. No.: 902,808

[22] Filed: May 4, 1978

[51] Int. Cl.$^2$ .............................................. F16C 1/10
[52] U.S. Cl. .................................. 74/501 R; 285/15; 285/31
[58] Field of Search ............................ 285/15, 22, 31; 74/501 R

[56] References Cited

U.S. PATENT DOCUMENTS

| | | | |
|---|---|---|---|
| 2,893,221 | 7/1959 | Bell | 64/1 |
| 3,074,253 | 1/1963 | Osterhoudt | 285/31 |
| 3,771,820 | 11/1973 | Hoss et al. | 285/373 |
| 3,826,521 | 7/1974 | Wilhelmsen | 285/15 |
| 3,909,045 | 9/1975 | Meagher | 285/22 |
| 3,955,441 | 5/1976 | Johnson | 74/501 |
| 4,013,309 | 3/1977 | Quick | 285/31 |
| 4,023,435 | 5/1977 | La Due | 74/501 |
| 4,023,831 | 5/1977 | Thompson | 285/31 |
| 4,066,281 | 1/1978 | De Bonis | 285/31 |

*Primary Examiner*—Samuel Scott
*Assistant Examiner*—Wesley S. Ratliff, Jr.
*Attorney, Agent, or Firm*—Bell, Seltzer, Park & Gibson

[57] ABSTRACT

A transmission detent cable having a damaged end fitting is repaired using the repair part and method of this invention, which involves replacement of only the damaged end portion of the cable so as to thereby facilitate reuse of the otherwise serviceable portions of the original detent cable. The replacement end portion comprises an elongate hollow tubular member having a circumferential groove at one end thereof of dimensions closely approximating the undamaged seal-receiving groove on the original cable housing end fitting, and the replacement end portion has an axially extending socket formed in the opposite end thereof of inside dimensions closely approximating the outside dimensions of the original end fitting, the socket being adapted to receive therein the portion of the original end fitting which remains after the damaged end portion has been severed and removed.

2 Claims, 5 Drawing Figures

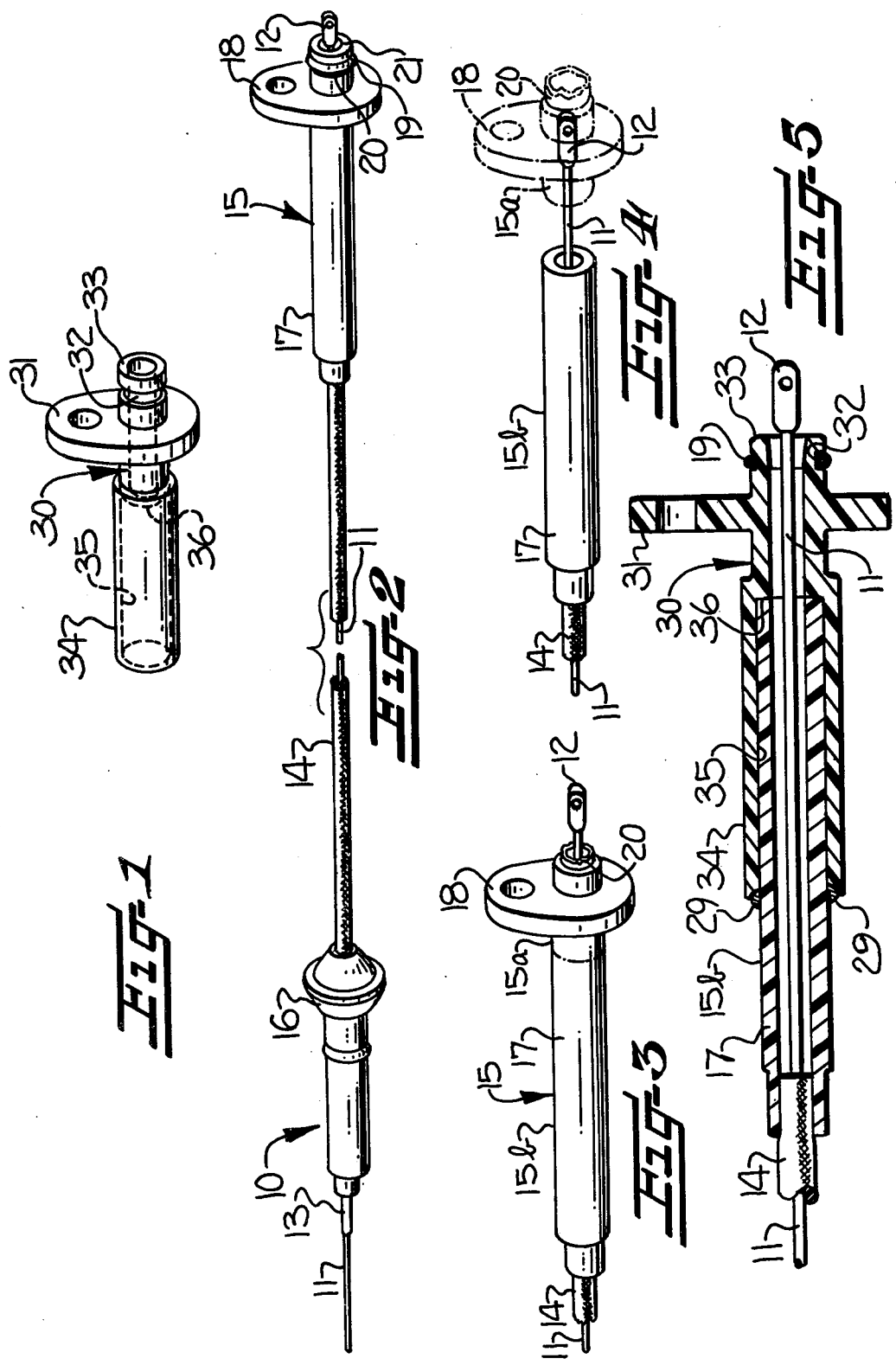

REPAIR PART AND METHOD FOR REPAIRING TRANSMISSION DETENT CABLE

FIELD OF THE INVENTION

This invention relates to a repair method and part for use in repairing automatic transmissions for automobiles.

BACKGROUND OF THE INVENTION

Certain types of motor vehicle automatic transmissions utilize what is commonly referred to as a "detent cable" for engaging the passing gear of the transmission. One end portion of the detent cable is connected to the accelerator or to the carburetor linkage and the other end of the cable extends into the transmission housing and is connected to the appropriate mechanism which controls the passing gear. When the motor vehicle accelerator is fully depressed, the detent cable actuates the mechanism for engaging the passing gear. Exemplary of this type of automatic transmission is the transmission commonly employed in nearly all recent General Motors automobiles having a 350 cubic inch engine.

The above-noted type of detent cable, more particularly, includes an elongate interior cable member usually formed of stranded steel wire, with eyelets or other suitable fittings at each end of the cable member for facilitating connection to the appropriate elements of the transmission at one end and to the accelerator or carburetor linkage at the other end. The elongate cable member is encased in a sheath-like cable housing which surrounds the cable member along substantially its entire length. At the end of the cable housing which extends into the transmission, an integrally formed end fitting is provided. The end fitting is conventionally formed of molded plastic and includes a mounting flange for securing the end fitting to the transmission housing and an external circumferential groove located closely adjacent the endmost portion of the end fitting. The circumferential groove is adapted for receiving a sealing member such as an O-ring for forming a seal with the transmission housing to prevent leakage of transmission fluid from the transmission housing when the end fitting is mounted in the transmission housing.

When servicing the automatic transmission, it is normally necessary to disconnect and remove the detent cable from the transmission housing. When removing the end fitting of the detent cable from the transmission housing, the seal-receiving groove is frequently damaged. Apparently, because of the high operating temperatures of the transmission, the integrally molded plastic end fitting becomes brittle and the seal-receiving groove becomes very susceptible to damage.

When the detent cable is damaged in this manner it is normally necessary to replace the entire detent cable, even though the only portion which is damaged is the end fitting which enters the transmission housing and the remainder of the detent cable is otherwise serviceable.

Because the transmission detent cables vary widely in length and other characteristics depending upon the particular automobile model for which they are intended, and because of the expense of the cables, it is impractical for most transmission service establishments to maintain an inventory of all the needed types of replacement detent cables. The replacement detent cables are presently available only from a relatively limited number of sources, and in actual practice it usually becomes necessary for the transmission service mechanic to make a special trip to a repair parts supplier to purchase the necessary replacement detent cable each time a defective detent cable is encountered.

With the foregoing in mind, it is an important object of the present invention to overcome the aforementioned problems and disadvantages arising from the frequent need for replacement of the transmission detent cable when an automatic transmission is serviced.

The present invention provides a method and means for repairing a transmission detent cable wherein only the damaged portion of the cable is replaced so as to thereby facilitate reuse of the otherwise serviceable portions of the original detent cable. More particularly, the present invention provides a unique repair part in the form of a replacement end portion adapted to be secured to the end fitting of the original detent cable after removal of the damaged portion.

The replacement end portion comprises an elongate hollow tubular member having a circumferential external groove at one end thereof of dimensions closely approximating the dimensions of the undamaged seal-receiving groove on the original cable housing end fitting. The opposite end portion of the elongate tubular body includes means forming an axially extending socket of inside dimensions closely approximating the outside dimensions of the integrally formed end fitting. The socket is adapted for receiving therein the end portion of the end fitting which remains after the damaged end portion has been severed and removed. In this manner only the damaged portion of the end fitting is replaced and the otherwise serviceable portions of the detent cable are reused at considerable savings in cost and time.

The method in accordance with this invention comprises severing the end fitting at a predetermined distance inwardly from the damaged seal-receiving groove and removing the damaged portion while leaving the interior cable member and the remaining portion of the end fitting intact. A replacement end portion of the type described above is positioned onto the remaining portion of the end fitting with the axially extending socket of the replacement end portion in coaxial telescoping relation around the remaining end portion of the end fitting. The seal-receiving groove of the replacement end portion is located a predetermined distance beyond the point of severing of the end fitting so as to thereby position the replacement end portion at a location relative to the remainder of the end fitting which is substantially identical to the location of the corresponding portions of the previously removed damaged original end portion. With the replacement end portion so positioned, it is then secured to the remaining portion of the end fitting by suitable means, such as adhesive.

BRIEF DESCRIPTION OF THE DRAWINGS

Some of the objects and features of the invention having been described, others will become apparent as the description proceeds, when taken in connection with the accompanying drawings, in which:

FIG. 1 is a perspective view showing a replacement end portion for a transmission detent cable in accordance with this invention;

FIG. 2 is a perspective view showing an undamaged transmission detent cable of the type for which the present invention is applicable;

FIG. 3 is a perspective view of the end fitting shown in the right-hand portion of FIG. 2, and illustrating how the end fitting of the detent cable typically appears when damaged;

FIG. 4 is a perspective view of the end fitting illustrating how the damaged end portion of the end fitting is severed and removed in accordance with the method of the present invention; and FIG. 5 is a cross sectional view of the end fitting of the detent cable with a replacement end portion provided thereon in accordance with the present invention.

DESCRIPTION OF ILLUSTRATED EMBODIMENT

Referring now more particularly to the drawings, a transmission detent cable of the type for which the present invention is applicable is indicated generally in FIG. 2 by the reference character 10. As illustrated, cable 10 includes an elongate interior cable member 11 formed of stranded stainless steel, with an eyelet 12 mounted at one end thereof for facilitating connecting the cable member to the transmission mechanisms located interiorly of the transmission housing, and with a fitting 13 carried by the opposite end of the cable member 11 for facilitating connecting the cable member to the carburetor or accelerator linkage. The cable member 11 is encased in a protective cable housing 14 which extends throughout the length of the cable member. The cable housing 14 includes an integrally formed end fitting 15 at the end of the cable which is secured to the transmission housing, and an end fitting 16 provided at the opposite end thereof for facilitating connection to the carburetor or accelerator linkage.

Referring more particularly to the end fitting 15, it will be noted that the fitting is in the form of an elongate tubular member 17 of circular cross section and of substantially uniform outside diameter throughout its length. An outwardly extending oval shaped mounting flange 18 is integrally formed on the exterior of the end fitting closely adjacent the endmost axial portion 21 thereof. A groove 20 is formed in the tubular member between the mounting flange 18 and the endmost axial end portion 21 of the fitting. The groove 20 is adapted for receiving a sealing member in the form of an O-ring 19 and for forming a fluid tight seal with the transmission housing when the end fitting is mounted in place on the transmission housing. The groove 20 is formed by a portion of the tubular member which is of reduced wall thickness.

As illustrated in FIG. 3, it will be noted that the groove 20 is damaged and the endmost portion (21 in FIG. 2) which is normally present at the end of the end fitting is broken away. Because of the thin wall thickness of the body at the location of the groove 20, the end portion 21 and groove 20 are very susceptible to damage. Very often when removing the detent cable from the transmission housing as is usually necessary for servicing the transmission, the seal-receiving groove 20 is damaged as shown in FIG. 3 so as to be incapable of receiving and retaining an O-ring therein. In this instance, it is usually necessary to replace the entire detent cable.

Referring now to FIG. 1, the replacement end portion in accordance with this invention includes an elongate hollow tubular member 30 of one piece molded plastic construction. A mounting flange 31 is formed on one end of the tubular member, with the mounting flange being of a size and at a location corresponding closely to the size and location of the mounting flange 18 for the original detent cable. A seal-receiving groove 32 is formed in the tubular member 30 closely adjacent the end 33 thereof. The groove 32 is of dimensions which closely approximate the dimensions of the undamaged seal-receiving groove 20 of the original cable housing end fitting. The end of the tubular member opposite the groove 32 includes an integrally formed enlarged diameter sleeve portion 34. Sleeve portion 34 defines an axially extending socket 35 in the form of a cylindrical recess of inside dimensions which closely approximate the outside dimensions of the integrally formed tubular member 17 of the end fitting 15.

In carrying out the method of this invention and in utilizing the replacement end portion of FIG. 1, it is first necessary to sever and remove the damaged portion of the original end fitting 15 from the remainder of the end fitting. Referring to FIG. 4, the damaged end portion of the end fitting is shown in broken lines and indicated by the reference character 15a. The remainder of the end fitting is shown in solid lines and indicated by the reference character 15b.

The end fitting 15 is severed at a predetermined location on the uniform diameter tubular member 17 and inwardly from the seal-receiving groove 20. The particular location on the tubular member is not critical, although the location is coordinated with the construction of the replacement end portion as will become apparent from a later more detailed description of the replacement end portion, in order to facilitate positioning of the various parts of the replacement end portion at approximately the same location as the corresponding parts on the original end portion. In actual practice, the location for the severing is most conveniently determined by measuring a predetermined distance, e.g. one inch from the mounting flange 18.

The severing may be conveniently accomplished by use of a hacksaw, or preferably by use of a tubing cutter of the type conventionally employed for cutting copper tubing and the like. Care is exercised to leave the interior cable member 11 intact. Once the damaged end portion 15a of the end fitting has been severed from the remaining portion 15b of the fitting, the damaged end portion 15a is slipped off of the interior cable member 11 and disposed of. Then the replacement end portion is slipped over the eyelet 12 at the end of the cable member 11 and the remaining end portion 15b of the original end fitting is positioned into the socket 35.

After positioning of the replacement end portion, a bead 29 of suitable adhesive is applied to the juncture between the socket 35 and the end portion 15b of the end fitting. Various types of commercially available adhesives may be employed and the selection of an appropriate adhesive is within the capability of one of ordinary skill in the art. In selecting a suitable adhesive, it is desirable to select a relatively fast setting adhesive and to select one which is compatible with the material from which the end fitting and replacement part are formed. The term adhesive as used herein is intended to encompass not only those materials like glue and cement which are of their very nature adhesive, but also those kinds of materials known as solvent adhesives and which accomplish bonding by softening or partially dissolving the plastic material of the parts being joined and forming a fusion weld or bond between the plastic parts.

Referring in more detail to the replacement end portion as specifically illustrated in FIG. 1, it will be noted that an abutment 36 is formed internally of the sleeve 34 a short distance inwardly from the open end of the sleeve. The abutment 36 is spaced a predetermined distance from the seal-receiving groove 32, and this distance corresponds to the distance between the original seal-receiving groove 20 and the point of severing of the damaged end portion 15a from the remainder of the end fitting 15b. Thus, when the replacement end portion is positioned onto the remaining portion of the end fitting and the end fitting is fully seated in the socket 35, the seal-receiving groove will be located at a location which is substantially identical to the location of the corresponding portions of the previously removed original end portion.

In the drawings and specification, there has been set forth a preferred embodiment of the invention, and although specific terms are employed, they are used in a generic and descriptive sense only and not for purposes of limitation.

That which is claimed is:

1. A repaired original equipment detent cable for an automatic transmission, said detent cable having an elongate interior cable member and a sheathlike cable housing surrounding the elongate cable member and having an integrally formed end fitting at one end of the cable housing adapted for extending into the transmission housing, and wherein the integrally formed end fitting of the detent cable normally includes a circumferential external groove adapted for receiving a sealing member, but wherein the seal-receiving groove of the end fitting has been damaged and the detent cable has thus been rendered unserviceable and would normally require replacement of the entire detent cable, and in combination with said damaged detent cable, a replacement end portion replacing the damaged portion of the end fitting and thereby permitting reuse of the otherwise serviceable portions of the original equipment detent cable, said replacement end portion comprising an elongate hollow tubular body of one piece molded plastic construction having a circumferential external groove formed therein at one end thereof located closely adjacent the endmost axial portion of the tubular body, said groove being of dimensions closely approximating the dimensions of the undamaged seal-receiving groove on the original cable housing end fitting, said elongate tubular body having an integrally formed outwardly extending mounting flange adjacent to said groove, and said elongate tubular body having an axially extending socket formed therein at the end of the tubular body opposite said groove, said socket being of an inside diameter closely approximating the outside diameter of the integrally formed end fitting of the detent cable, and said socket receiving therein the portion of the end fitting which remains after the damaged end portion has been severed and removed, and said socket including an interior abutment located a predetermined distance axially inwardly from the open end thereof for limiting how far the remaining portion of the original end fitting is received within the socket and for facilitating proper positioning of the replacement end portion on the end fitting, thereby permitting replacement of only the damaged portion of the end fitting and facilitating reuse of the otherwise serviceable portions of the detent cable, and means securing the remaining portion of the original end fitting to the replacement end portion.

2. A replacement end portion for repairing a detent cable for an automatic transmission, the detent cable having an elongate interior cable member and a sheathlike cable housing surrounding the elongate cable member and having an integrally formed end fitting at one end of the cable housing adapted for extending into the transmission housing, and wherein the integrally formed end fitting includes a circumferential external groove adapted for receiving a sealing member, the seal-receiving groove of the end fitting being susceptible to damage when the end fitting is removed from the transmission housing for servicing the transmission and resulting in the detent cable being rendered unserviceable and normally requiring replacement of the entire detent cable, said replacement end portion comprising an elongate hollow tubular body of one piece molded plastic construction having a circumferential external groove formed therein at one end thereof located closely adjacent the endmost axial portion of the tubular body, said groove being of dimensions closely approximating the dimensions of the undamaged seal-receiving groove on the original cable housing end fitting, said elongate tubular body having an integrally formed outwardly extending mounting flange adjacent to said groove, and said elongate tubular body having an axially extending socket formed therein at the end of the tubular body opposite said groove, said socket having an inside diameter closely approximating the outside diameter of the integrally formed end fitting of the detent cable, and said socket being adapted for receiving therein the portion of the end fitting which remains after the damaged end portion has been severed and removed, and said socket including an interior abutment located a predetermined distance axially inwardly from the open end thereof for limiting how far the remaining portion of the original end fitting may be received within the socket and for facilitating proper positioning of the replacement end portion on the end fitting, thereby permitting replacement of only the damaged portion of the end fitting and facilitating reuse of the otherwise serviceable portions of the detent cable.

* * * * *